B. B. MEARS.
SPRING CHECK.
APPLICATION FILED NOV. 27, 1907.

950,773.                                               Patented Mar. 1, 1910.

WITNESSES                                              INVENTOR
                                                       B. B. Mears
                                                    BY
                                                       Criswell & Criswell
                                                              ATTORNEYS

UNITED STATES PATENT OFFICE.

BERNARD B. MEARS, OF BALTIMORE, MARYLAND.

SPRING-CHECK.

950,773. Specification of Letters Patent. Patented Mar. 1, 1910.

Application filed November 27, 1907. Serial No. 404,111.

*To all whom it may concern:*

Be it known that I, BERNARD B. MEARS, a citizen of the United States, and a resident of the city of Baltimore and State of Maryland, have invented certain new and useful Improvements in Spring-Checks, of which the following is a full, clear, and exact description.

This invention relates more particularly to a spring check for automobiles.

The primary object of the invention is to provide simple and efficient means which may be readily applied to various kinds of motor or other vehicles, and which will not offer any resistance to the movement of the body on its downward thrust in passing over obstructions, and thereby affect the resiliency of the ordinary body springs, but which will take up the shock or thrust of the body in case of any unusual movement thereof on its upward throw, and thereby prevent the breaking of the springs as often occurs in vehicles of this class as ordinarily constructed.

A further object of the invention is to provide a simple device which may be readily applied to a vehicle without changing the construction thereof; which is simple in construction, and can be readily and quickly applied; and which may be so made that it will resist the recoil of the body, and therefore check and take the strain off the body springs on both sides of the vehicle, instead of requiring a separate device on each side adjacent to each spring.

With these and other objects in view, the invention will be hereinafter more particularly described with reference to the accompanying drawings, which form a part of this specification, and will then be pointed out in the claims at the end of the description.

Figure 1:
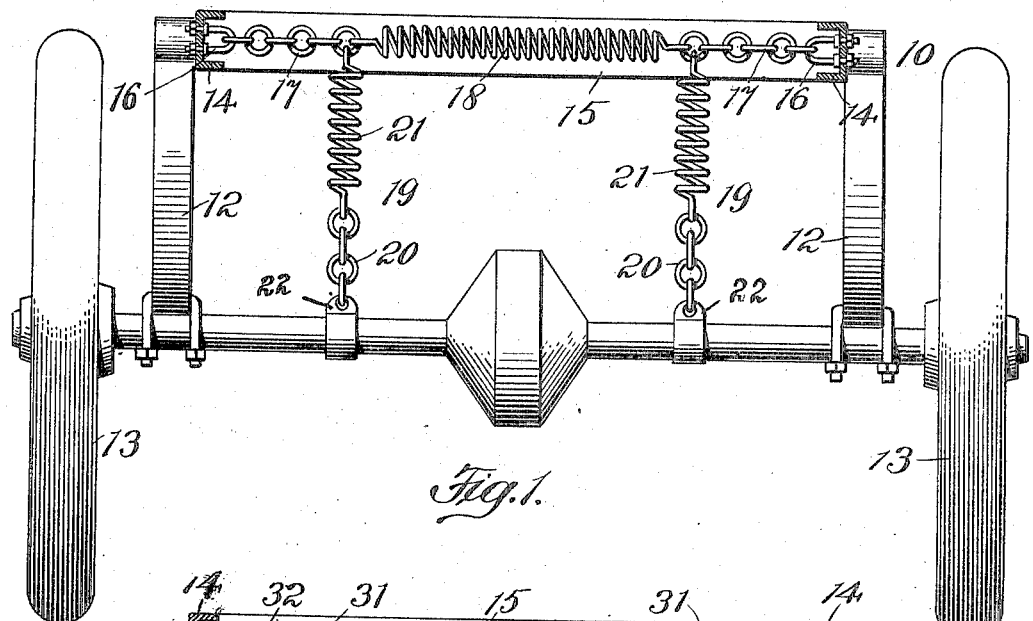
Figure 2:
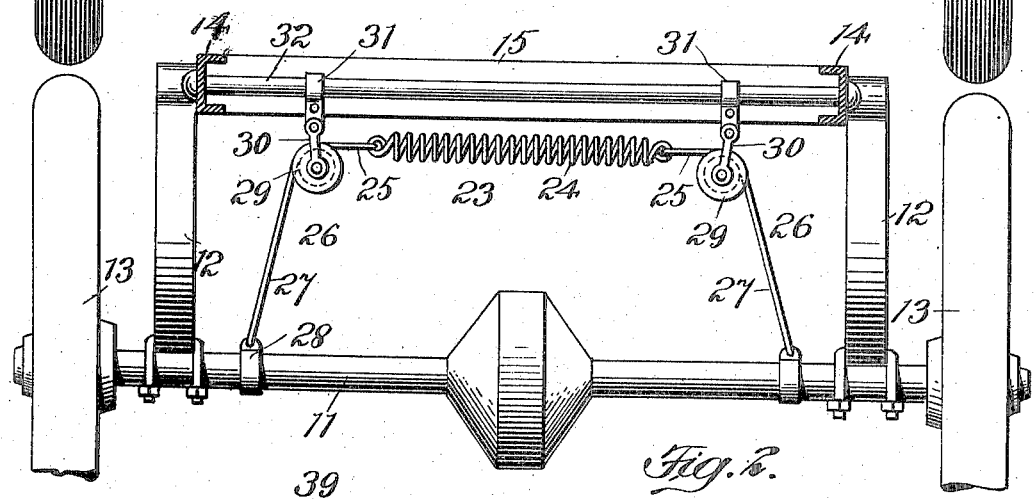
Figures 3, 4:
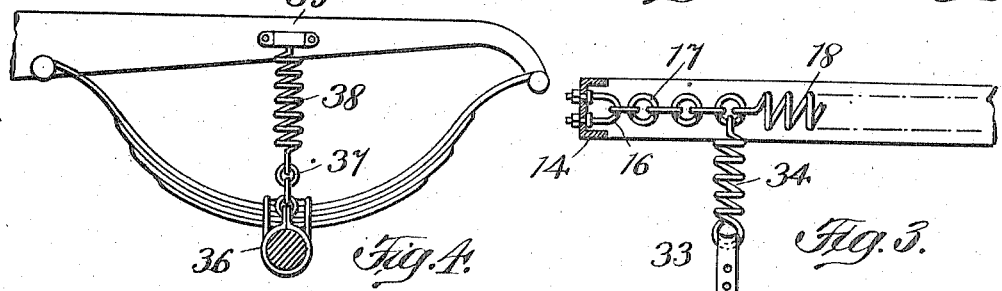

In the drawings, Figure 1 is an end elevation, partly in section, of one form of vehicle embodying my invention. Fig. 2 is a similar view to Fig. 1 showing a different form of spring check; and Figs. 3 and 4 are other views showing other forms of spring checks.

The frame 10 of the vehicle may be supported on the axle 11 by full or part elliptical springs 12, and on the axles are the wheels 13 all of which may be of the usual or of any preferred construction. The frame 10 has the usual longitudinally-extending frame bars 14, which may be braced transversely by means of a bar 15 or otherwise, and secured to each of the frame bars 14 is an eye 16 to which is connected a chain part or section 17. The chain sections 17 extend transversely of the vehicle and are connected together at their inner ends by a spring 18, which may be of any suitable strength, and which normally holds the chain members 17 in substantially a horizontal position. Extending vertically from the horizontal members are the vertical members 19 one of which is located on each side of the longitudinal center of the vehicle, and said members 19 may each comprise a non-yielding chain part or section 20 and a spring or yielding part 21. Each spring 21 is connected to the chain 17, and the chain section 20 of each member 19 is connected to an eye or yoke 22 which fits around and is held to the axle 11. As will be seen the vehicle body on its downward throw, in case of a jolt, will be resisted by the usual body springs 12 only, owing to the flexible nature of the members 19, but on the upward throw and at the desired point the members 19 tending to hold the horizontal member in a substantially fixed position will cause the spring 18 to yield, and in doing so will check or retard the upward movement of the vehicle body, and thereby prevent unusual strain on the body springs 12, which often results in the breakage of said springs.

While I have shown the horizontal member as comprising chain sections 17 and a spring 18, and have shown the springs 21 as forming a part of the vertical members 19, it will be understood that instead of chains any suitable flexible and non-yielding means may be employed, and that the springs 21 of the vertical members 19 may be dispensed with, and the chain or other flexible non-yielding means connected direct to the horizontal member, depending thereby entirely for the resisting and checking means on the spring 18, which may be of any strength according to the nature of the vehicle to which it is applied.

In Fig. 2 the horizontal member 23 comprises a spring 24 to the ends of which is connected the horizontally extending part 25 of a flexible cable or other means 26. This cable 26 has a substantially vertical member 27, and said cable is fastened at one end to the yokes 28 located on the axle 11 at each side of the vertical center thereof, and passes around pulleys 29 that are suitably held to arms 30. These arms 30 are connected to yokes or brackets 31, which are rigidly held to a transverse bar 32, and said bar extends transversely of the vehicle and is held to the frame bars 14 of the vehicle. In this construction the springs 12 will be checked in any unusual movement by the cables 26, and the spring 24 will yield sufficiently to prevent unnecessary and too sudden upward throw of the vehicle body in case of a sudden jolt as when passing over obstructions.

The construction shown in Fig. 3 is substantially the same as that shown in Fig. 1, except that the vertical member 33 comprises a spring 34 and a strap or non-yielding part or section 35 instead of the chain section 20 of said figure, and as set forth in connection with Fig. 1 the spring 34 may be dispensed with, and the strap 35 made to connect direct with the horizontal member.

In Fig. 4, the construction shown may, in some instances, be more readily applied than that of the other figures, and may be used in connection with each spring of the vehicle. As shown the axle 11 is provided with a yoke 36 to which is connected a chain section 37, and a spring 38, the upper end of which spring is rigidly connected to the frame bar 39 of the vehicle body. As will be seen the spring 38 will serve to check the upward movement of the vehicle body in case the throw thereof is unusual; while the chain and non-yielding part 37 serves to permit the body to move downward without any additional resistance being offered to the usual vehicle springs.

From the foregoing it will be seen that a simple and efficient device is provided which will permit the vehicle body to move downward without any resistance being offered thereto other than the usual body springs, and will resist any unusual upward movement of the body and thereby prevent the breakage of the springs as often occurs in passing over obstructions or any unusual movement of the vehicle body.

Having thus described my invention, I claim as new and desire to secure by Letters Patent:—

1. The combination with a vehicle frame having side bars, an axle, and means for yieldingly supporting the frame above said axle, of a resilient checking member extending transversely of the frame between said side bars, means carried by the side bars for supporting said checking member, and flexible members connecting said checking member and said axle.

2. The combination with a vehicle frame having side bars, an axle, and means for yieldingly supporting the frame above said axle, of a resilient checking member extending transversely of the frame between said side bars, means carried by the side bars for supporting said checking member, and resilient members connecting said checking member and said axle.

3. The combination with a vehicle frame having side bars, an axle, and means for yieldingly supporting the frame above said axle, of a resilient checking member extending transversely of the frame between said side bars, flexible connections between said checking member and said side bars, and flexible connections between said checking member and said axle.

4. A checking device comprising a resilient member constructed to be suspended by its ends, and a plurality of resilient members connected to the first member and arranged substantially at right angles thereto.

5. A checking device comprising a resilient member constructed to be suspended by its ends, and a plurality of parallel resilient members, each arranged substantially at right angles to the first member and having one end connected to the latter.

6. A checking device comprising a resilient member constructed to be suspended by its ends, flexible supports connected to each end thereof, and a plurality of resilient members connected to the first member and arranged substantially at right angles thereto.

This specification signed and witnessed this 23rd day of November A. D. 1907.

BERNARD B. MEARS.

Witnesses:
JOHN W. HILL,
HENRY STARK.